(12) United States Patent
Tarassoli

(10) Patent No.: US 11,878,918 B2
(45) Date of Patent: Jan. 23, 2024

(54) SYSTEM FOR WATER DESALINATION AND ELECTRICITY GENERATION

(71) Applicant: AmirAbbas Tarassoli, Tehran (IR)

(72) Inventor: AmirAbbas Tarassoli, Tehran (IR)

( * ) Notice: Subject to any disclaimer, the term of this patent is extended or adjusted under 35 U.S.C. 154(b) by 0 days.

(21) Appl. No.: 18/008,453

(22) PCT Filed: Jun. 21, 2021

(86) PCT No.: PCT/IB2021/055424
§ 371 (c)(1),
(2) Date: Dec. 6, 2022

(87) PCT Pub. No.: WO2021/260515
PCT Pub. Date: Dec. 30, 2021

(65) Prior Publication Data
US 2023/0202870 A1      Jun. 29, 2023

Related U.S. Application Data

(60) Provisional application No. 63/042,578, filed on Jun. 23, 2020.

(51) Int. Cl.
*C02F 1/04* (2023.01)
*C02F 1/16* (2023.01)
*C02F 103/08* (2006.01)

(52) U.S. Cl.
CPC .............. *C02F 1/048* (2013.01); *C02F 1/04* (2013.01); *C02F 1/043* (2013.01); *C02F 1/16* (2013.01); *C02F 2103/08* (2013.01); *C02F 2201/004* (2013.01); *C02F 2209/42* (2013.01); *C02F 2303/10* (2013.01); *F05B 2220/20* (2013.01); *Y02A 20/124* (2018.01)

(58) Field of Classification Search
CPC .. C02F 1/04; C02F 1/043; C02F 1/048; C02F 1/16; C02F 2103/08; C02F 2209/42; C02F 2303/10; C02F 2201/004; F03B 17/06; F05B 2220/20; F05B 2260/422; Y02A 20/124; Y02E 60/16; Y02W 10/30
See application file for complete search history.

(56) References Cited

U.S. PATENT DOCUMENTS

2007/0245730 A1\* 10/2007 Mok .................... F03G 6/0055
60/641.8

\* cited by examiner

*Primary Examiner* — Loren C Edwards
(74) *Attorney, Agent, or Firm* — Bajwa IP Law Firm; Haris Zaheer Bajwa

(57) ABSTRACT

A system for water desalination and power generation. The system includes a power generation section and a desalination section. The power generation section includes a first tank, a second tank, and a first channel. The desalination section includes a third tank, a fourth tank, and a second channel. The system utilizes waste energy in power plants to desalinate water and generate power. The disclosed system is able to improve the performance of power plants, by utilizing the wasted power of the exit steam, to desalinate seawater and even generate electricity. The disclosed system alleviates requirements for cooling towers and introduces thermal exchange tanks, radiators, and sprinkles instead of cooling towers.

6 Claims, 3 Drawing Sheets

SYSTEM FOR WATER DESALINATION AND ELECTRICITY GENERATION

CROSS-REFERENCE TO RELATED APPLICATION

This application is a national stage of PCT/IB2021/055424 filed Jun. 21, 2021, entitled "SYSTEM FOR WATER DESALINATION AND ELECTRICITY GENERATION," which is incorporated herein by reference in its entirety.

TECHNICAL FIELD

The present disclosure generally relates to water desalination and electricity generation systems and, particularly relates to a system that is able to desalinate untreated water and/or generate electricity by utilizing excess thermal energy.

BACKGROUND ART

Thermal power plants generate a significant amount of the world's electricity through producing a hot steam from fossil, atomic, or solar energies and by utilizing a boiler in order to recycle water, the steam may pass through cooling towers where water may lose water's heat and energy and, to thereby, may convert to liquid. Nowadays, different methods are used for industrial desalination of seawater from wasted energy produced in thermal power plants. These methods include multistage distillation (MSF), multi-effect distillation (MED), and thermal vapor compression (TVC).

Since the excess energy is not fully utilized in conventional desalination methods using wasted energy produced in thermal power plants, the efficiency of fresh water production may not be so high. Therefore, there is a need for a system for water desalination by utilizing wasted energy produced in thermal power plants without any need for cooling towers.

SUMMARY OF THE DISCLOSURE

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments of the present disclosure, a system for water desalination and electricity generation is disclosed. In an exemplary embodiment, the system may include a power generation section, a desalination section.

In an exemplary embodiment, the power generation section may include a first tank, a second tank, a first channel, and a first turbine. In an exemplary embodiment, the first tank may be configured to store water. In an exemplary embodiment, the second tank may be configured to store water. In an exemplary embodiment, a top end of the second tank may be in fluid communication with the first tank through a first tube. In an exemplary embodiment, the first tube may be configured to allow water to go from the second tank to the first tank.

In an exemplary embodiment, a first end of the first channel may be connected to a top end of the first tank. In an exemplary embodiment, a second end of the first channel may be disposed inside the second tank. In an exemplary embodiment, the power generation section may further include a second tube. In an exemplary embodiment, a first end of the second tube may be connected to the second end of the first channel. In an exemplary embodiment, the second tube may pass through the fourth tank and return to a bottom end of the second tank.

In an exemplary embodiment, the first turbine may be disposed inside the first channel. In an exemplary embodiment, the first turbine may be configured to generate electricity responsive to passage of steam inside the first channel.

In an exemplary embodiment, the desalination section may include a third tank, a fourth tank, and a second channel. In an exemplary embodiment, the third tank may be configured to store water. In an exemplary embodiment, the fourth tank may be configured to store water. In an exemplary embodiment, a top end of the fourth tank may be in fluid communication with the third tank through a third tube. In an exemplary embodiment, a bottom end of the fourth tank may be in fluid communication with an amount of saline water contained in a saline water tank through a fourth tube. In an exemplary embodiment, the fourth tube may be configured to allow saline water to go from the saline water tank to the fourth tank. In an exemplary embodiment, a first end of the second channel may be connected to a top end of the third tank. In an exemplary embodiment, a second end of the second channel may be disposed inside the fourth tank.

In an exemplary embodiment, the desalination section may further include a fifth tube. In an exemplary embodiment, a first end of the fifth tube may be connected to a bottom end of the third tank. In an exemplary embodiment, the fifth tube may be configured to allow water to go out from the third tank. In an exemplary embodiment, a medium section of the fifth tube may be disposed inside the fourth tank. In an exemplary embodiment, the medium section of the fifth tube may be configured to allow heat transfer between water inside the fifth tube and saline water inside the fourth tank.

In an exemplary embodiment, the disclosed system may further include a sixth tube. In an exemplary embodiment, a first end of the sixth tube may be connected to a turbine of a power plant. In an exemplary embodiment, the first end of the sixth tube may be configured to receive hot steam from a turbine of a power plant. In an exemplary embodiment, a second end of the sixth tube may be connected to a boiler of the power plant. In an exemplary embodiment, the second end of the sixth tube may be configured to deliver cool water to the boiler of the power plant.

In an exemplary embodiment, a first section of the sixth tube may be disposed inside the first tank. In an exemplary embodiment, the first section of the sixth tube may be configured to allow heat transfer between water inside the first section of the sixth tube and water inside the first tank. In an exemplary embodiment, a second section of the sixth tube may be disposed inside the third tank. In an exemplary embodiment, the second section of the sixth tube may be configured to allow heat transfer between water inside the second section of the sixth tube and saline water inside the third tank.

In an exemplary embodiment, a third section of the sixth tube may be disposed inside the fourth tank. In an exemplary embodiment, the third section of the sixth tube may be configured to allow heat transfer between water inside the third section of the sixth tube and saline water inside the fourth tank. In an exemplary embodiment, the first section of the sixth tube may directly be connected to the first end of the sixth tube. In an exemplary embodiment, the third section of the sixth tube may directly be connected to the second end of the sixth tube.

In an exemplary embodiment, the sixth tube may be configured to receive an amount of hot steam from the turbine of the power plant at the first end of the sixth tube. In an exemplary embodiment, the sixth tube may further be configured to generate an amount of cooled water from the amount of hot water by passing the amount of hot water through the first section of the sixth tube, the second section of the sixth tube, and the third section of the sixth tube. In an exemplary embodiment, the sixth tube may further be configured to deliver the amount of the cooled water to the boiler of the power plant at the second end of the sixth tube.

In an exemplary embodiment, when a first amount of water passes through the first section of the sixth tube, the first amount of water may cool down due to heat transfer between the first amount of water and water inside the first tank. In an exemplary embodiment, when a second amount of water passes through the second section of the sixth tube, the second amount of water may cool down due to heat transfer between the second amount of water and water inside the third tank.

In an exemplary embodiment, when a third amount of water passes through the third section of the sixth tube, the third amount of water may cool down due to heat transfer between the third amount of water inside the third section of the sixth tube and saline water inside the fourth tank.

In an exemplary embodiment, the second tube may include a medium section. In an exemplary embodiment, the medium section of the second tube may be disposed inside the fourth tank. In an exemplary embodiment, the medium section of the second tube may be configured to allow heat transfer between water inside the medium section of the second tube and saline water inside the fourth tank. In an exemplary embodiment, when the first amount of water passes through the first section of the sixth tube, a fourth amount of water from water inside the first tank may evaporate and enter the first channel.

In an exemplary embodiment, when the fourth amount of water passes through the second end of the first channel, the fourth amount of water may cool down due to heat transfer between the fourth amount of water and water inside the second tank, the fourth amount of water may enter the second tube, and water inside the second tank may heat up.

In an exemplary embodiment, when the fourth amount of water passes through the medium section of the second tube, the fourth amount of water may cool down due to heat transfer between the fourth amount of water and water inside the fourth tank and the fourth amount of water may enter the second tank from the bottom end of the second tank. In an exemplary embodiment, the medium section of the fifth tube, the medium section of the second tube, the third section of the sixth tube, and the second end of the second channel may be configured to heat up saline water inside the fourth tank. In an exemplary embodiment, the second section of the sixth tube may be configured to heat up saline water inside the third tank.

In an exemplary embodiment, when saline water inside the third tank heats up, an amount of desalinated water may evaporate and enter the second channel, the amount of desalinated water may cool down at the second end of the second channel due to heat transfer between the amount of desalinated water inside the second channel and saline water inside the fourth tank, the amount of desalinated water may go out from the second end of the second channel, and an amount of saline water may go out from the bottom end of the third tank through the fifth tube. In an exemplary embodiment, when the amount of desalinated water is cooled down at the second end of the second channel, the amount of desalinated water may condensate and, to thereby, desalinated liquid water may be obtained. Simultaneously, heat transfer between the second channel and the fourth tank may heat up water inside the fourth tank.

In an exemplary embodiment, a first end of the first tube may be connected to the top end of the second tank. In an exemplary embodiment, a second end of the first tube may be connected to the first tank. In an exemplary embodiment, the desalination section may further include a plurality of water sprinklers. In an exemplary embodiment, the plurality of water sprinklers may be disposed inside the third tank and above the second section of the sixth tube. In an exemplary embodiment, the plurality of water sprinklers may be attached to the second end of the third tube. In an exemplary embodiment, the plurality of water sprinklers may be in fluid communication with the third tube. In an exemplary embodiment, the plurality of water sprinklers may be configured to sprinkle water onto the second section of the sixth tube.

In an exemplary embodiment, the desalination section may further include a float mechanism disposed inside the saline water tank. In an exemplary embodiment, the float mechanism may be configured to control a level of saline water inside the saline water tank. In an exemplary embodiment, when a level of saline water decreases inside the saline water tank, the float mechanism may allow saline water to be poured into the saline water tank. In an exemplary embodiment, the second end of the first channel may be disposed at the bottom end of the second tank. In an exemplary embodiment, the second end of the second channel may be disposed at the bottom end of the fourth tank.

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION OF EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Figure 1A:
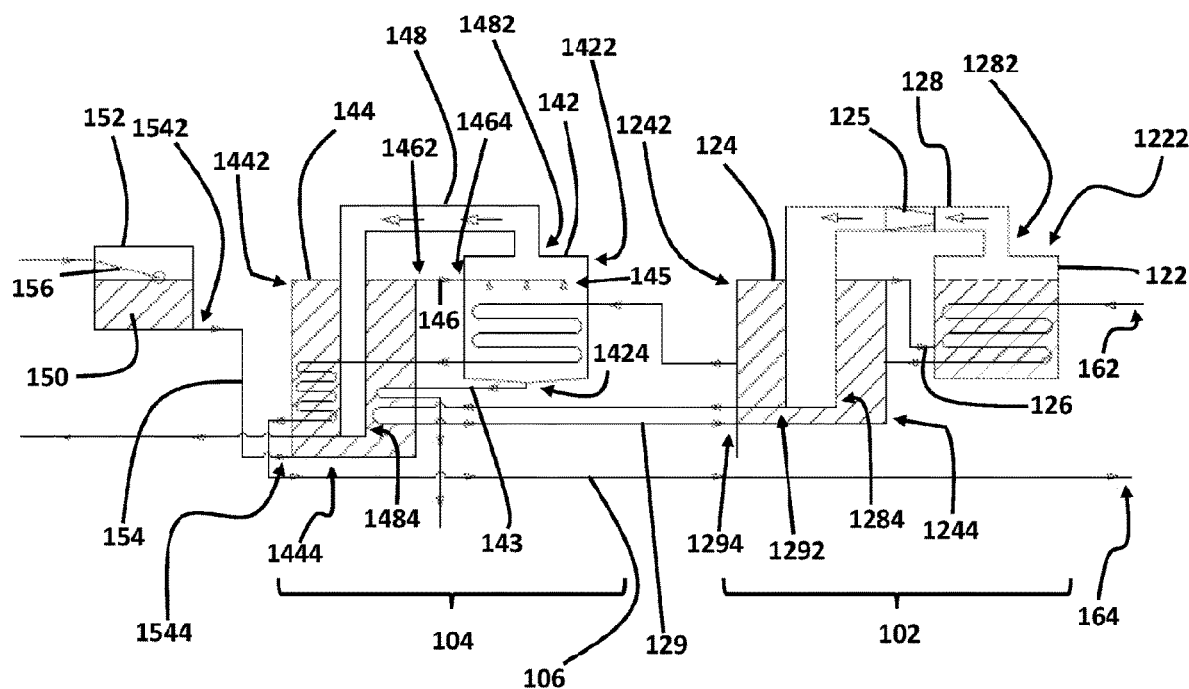
FIG. 1A illustrates a schematic view of a system for water desalination and electricity generation, consistent with one or more exemplary embodiments of the present disclosure.
Figure 1B:
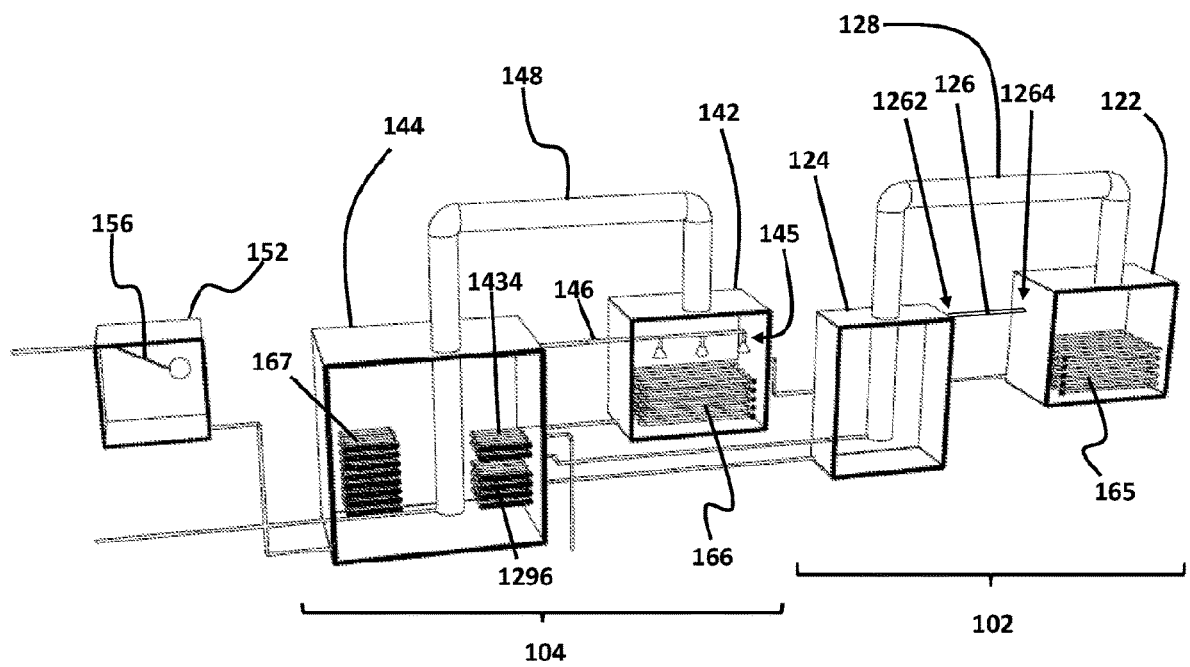
FIG. 1B illustrates a detailed perspective view of a system for water desalination and electricity generation, consistent with one or more exemplary embodiments of the present disclosure.
Figure 1C:
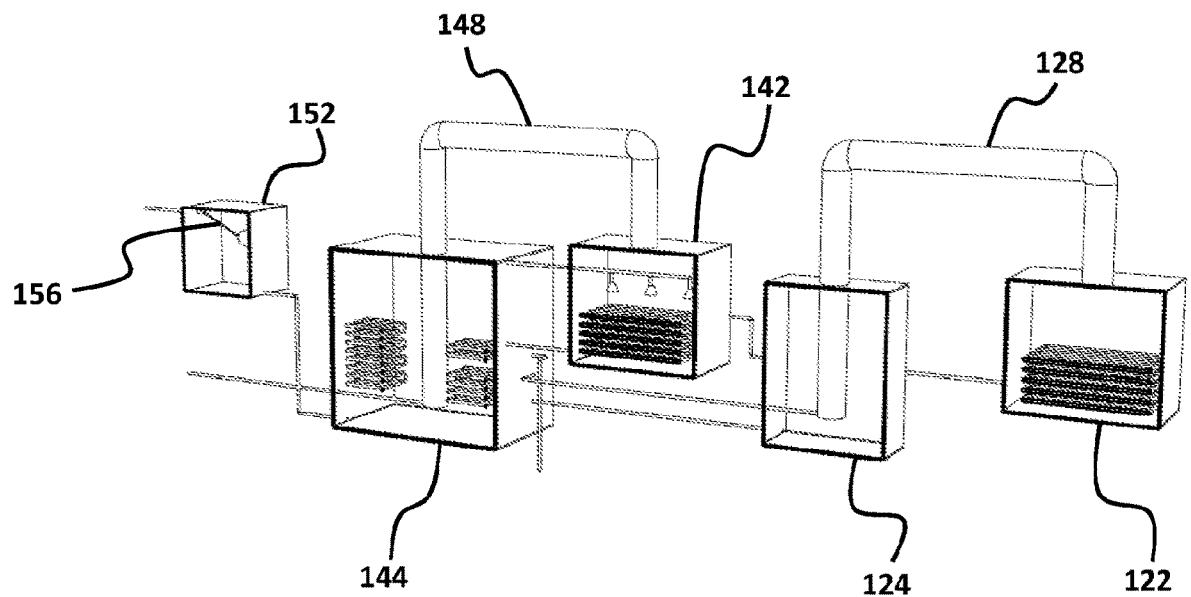
FIG. 1C illustrates another detailed perspective view of a system for water desalination and electricity generation, consistent with one or more exemplary embodiments of the present disclosure.

FIG. 1A shows a schematic view of a system 100 for water desalination and electricity generation, consistent with one or more exemplary embodiments of the present disclosure. FIG. 1B shows a perspective view of system 100 for water desalination and electricity generation, consistent with one or more exemplary embodiments of the present disclosure. FIG. 1C shows another detailed perspective view of system 100 for water desalination and electricity generation, consistent with one or more exemplary embodiments of the present disclosure.

As shown in FIG. 1A and FIG. 1B, in an exemplary embodiment, system 100 may include a power generation section 102 and a desalination section 104. In an exemplary embodiment, power generation section 102 may include a first tank 122. In an exemplary embodiment, first tank 122 may be configured to store water. In an exemplary embodiment, power generation section 102 may further include a second tank 124. In an exemplary embodiment, second tank 124 may be configured to store water. In an exemplary embodiment, a top end 1242 of second tank 124 may be in fluid communication with first tank 122 through a first tube 126. In an exemplary embodiment, a first end 1262 of first tube 126 may be connected to top end 1242 of second tank 124. In an exemplary embodiment, a second end 1264 of first tube 126 may be connected to first tank 122. In an exemplary embodiment, water may go from second tank 124 to first tank 122 through first tube 126.

In an exemplary embodiment, power generation section 102 may further include a first channel 128. In an exemplary embodiment, a first end 1282 of first channel 128 may be connected to a top end 1222 of first tank 122. In an exemplary embodiment, a second end 1284 of first channel 128 may be disposed inside second tank 124. In an exemplary embodiment, power generation section 102 may further include a second tube 129. In an exemplary embodiment, a first end 1292 of second tube 129 may be connected to second end 1284 of first channel 128. In an exemplary embodiment, a second end 1294 of second tube 129 may be connected to a bottom end 1244 of second tank 124. In an exemplary embodiment, second tube 129 may be configured to allow water to go from first channel 128 to second tank 124.

In an exemplary embodiment, power generation section 102 may further include a first turbine 125. In an exemplary embodiment, first turbine 125 may be disposed inside first channel 128. In an exemplary embodiment, when steam moves inside first channel 128, first turbine 125 may generate electricity.

As further shown in FIG. 1A and FIG. 1B, in an exemplary embodiment, desalination section 104 may include a third tank 142. In an exemplary embodiment, third tank 142 may be configured to store water. In an exemplary embodiment, desalination section 104 may further include a fourth tank 144. In an exemplary embodiment, fourth tank 144 may be configured to store water. In an exemplary embodiment, a top end 1442 of fourth tank 144 may be in fluid communication with third tank 142 through a third tube 146. In an exemplary embodiment, a first end 1462 of third tube 146 may be connected to top end 1442 of fourth tank 144. In an exemplary embodiment, a second end 1464 of third tube 146 may be connected to third tank 142.

In an exemplary embodiment, a bottom end 1444 of fourth tank 144 may be in fluid communication with an amount of saline water 150 contained in a saline water tank 152 through a fourth tube 154. In an exemplary embodiment, saline water 150 contained in saline water tank 152 may refer to seawater and saline water tank 152 may refer to sea. In an exemplary embodiment, a first end 1542 of fourth tube 154 may be connected to saline water tank 152. In an exemplary embodiment, a second end 1544 of fourth tube 154 may be connected to bottom end 1444 of fourth tank 144. In an exemplary embodiment, fourth tube 154 may be configured to allow saline water to go from saline water tank 152 to fourth tank 144.

In an exemplary embodiment, desalination section 104 may further include a second channel 148. In an exemplary embodiment, a first end 1482 of second channel 148 may be connected to a top end 1422 of third tank 142. In an exemplary embodiment, a second end 1484 of second channel 148 may be disposed inside fourth tank 144. In an exemplary embodiment, the second channel 148 may be configured to allow water steam to go from third tank 142 to fourth tank 144. As further shown in FIG. 1A and FIG. 1B, in an exemplary embodiment, a medium section 1296 of second tube 129 may be disposed inside fourth tank 144. In an exemplary embodiment, it may be understood that when a medium section 1296 of second tube 129 may be disposed inside fourth tank 144, the fluid inside second tube 129 may have heat transfer with the fluid inside fourth tank 144.

In an exemplary embodiment, desalination section 104 may further include a fifth tube 143. In an exemplary embodiment, a first end 1432 of fifth tube 143 may be connected to a bottom end 1424 of third tank 142. In an exemplary embodiment, fifth tube 143 may be configured to allow water to go out from third tank 142. In an exemplary embodiment, fifth tube 143 may further include a medium section 1434. In an exemplary embodiment, medium section 1434 of fifth tube 143 may be disposed inside fourth tank 144. In an exemplary embodiment, it may be understood that when medium section 1434 is disposed inside fourth tank 144, saline water inside medium section 1434 of fifth tube 143 may have heat transfer with saline water inside fourth tank 144. In an exemplary embodiment, when saline water passes through medium section 1434 of fifth tube 143, saline water inside fourth tank 144 may heat up.

In an exemplary embodiment, system 100 for water desalination and electricity generation may further include a sixth tube 106. In an exemplary embodiment, a first end 162 of sixth tube 106 may be connected to a turbine of a power plant. In an exemplary embodiment, first end 162 of sixth tube 106 may be configured to receive hot steam from a turbine of a power plant. In an exemplary embodiment, a second end 164 of sixth tube 106 may be connected to a boiler of the power plant. In an exemplary embodiment, second end 164 of sixth tube 106 may be configured to deliver cool water to the boiler of the power plant. In an exemplary embodiment, sixth tube 106 may include a first section 106. In an exemplary embodiment, first section 165 of sixth tube 106 may be disposed inside first tank 122. In an exemplary embodiment, first section 165 of sixth tube 106 may be configured to allow heat transfer between water inside first section 165 of sixth tube 106 and water inside first tank 122. In an exemplary embodiment, when an amount of water passes through first section 165 of sixth tube 106, the water inside first section 165 of sixth tube 106 may cool down due to heat transfer with the colder water inside first tank 122. In an exemplary embodiment, first section 165 of sixth tube 106 may be directly attached to first end 162 of sixth tube 106.

In an exemplary embodiment, sixth tube 106 may further include a second section 166. In an exemplary embodiment, second section 166 of sixth tube 106 may be disposed inside third tank 142. In an exemplary embodiment, second section 166 of sixth tube 106 may be configured to allow heat transfer between water inside second section 166 of sixth tube 106 and water inside third tank 142. In an exemplary embodiment, when an amount of water passes through second section 166 of sixth tube 106, the water inside second section 166 of sixth tube 106 may cool down due to heat transfer with the colder water inside third tank 142. In an exemplary embodiment, sixth tube 106 may include a third section 167. In an exemplary embodiment, third section 167 of sixth tube 106 may be disposed inside fourth tank 144. In an exemplary embodiment, third section 167 of sixth tube 106 may be configured to allow heat transfer between water inside third section 167 of sixth tube 106 and saline water inside fourth tank 144. In an exemplary embodiment, when an amount of water passes through third section 167 of sixth tube 106, the water inside third section 167 of sixth tube 106 may cool down due to heat transfer with the colder water inside fourth tank 144. In an exemplary embodiment, third section 167 of sixth tube 106 may be directly attached to second end 164 of sixth tube 106.

In an exemplary embodiment, sixth tube 106 may be configured to receive an amount of hot steam from the turbine of the power plant at first end 162 of sixth tube 106. In an exemplary embodiment, sixth tube may further be configured to generate an amount of cooled water from the amount of hot water by passing the amount of hot water through first section 165 of sixth tube 106, second section 166 of sixth tube 106, and third section 167 of sixth tube 106. In an exemplary embodiment, sixth tube 106 may further be configured to deliver the amount of cooled water to the boiler of the power plant at second end 164 of sixth tube 106. In an exemplary embodiment, it may be understood that system 100 may act as a cooling tower for the power plant.

With further reference to FIG. 1A and FIG. 1B, in an exemplary embodiment, an amount of water inside first tank 122 may be vaporized and, to thereby, may be converted to steam due to heat transfer with hot water inside first section 165 of sixth tube 106. In an exemplary embodiment, the steam may enter first channel 128 and pass through first turbine 125. In an exemplary embodiment, when steam passes through first turbine 125, first turbine 125 may generate electricity. After that, the steam may pass through second end 1284 of first channel 128 and, to thereby, the steam may cool down and convert to liquid water. Then, in an exemplary embodiment, the converted liquid water may enter second tube 129 and may pass through medium section 1296 of second tube 129. In an exemplary embodiment, when steam passes through first channel 128 and medium section 1296 of second tube 129, the steam may cool down and convert to liquid water and then may return to second tank 124 from bottom end 1244 of second tank 124. In an exemplary embodiment, whenever a level of water inside first tank 122 becomes lower than top end 1242 of second tank 124, water may flow from second tank 124 to first tank 122 through first tube 126.

With further reference to FIG. 1A and FIG. 1B, in an exemplary embodiment, a level of saline water inside saline water tank 152 may be the same or higher than top end 1442 of fourth tank 144. In an exemplary embodiment, it may be understood that when level of saline water inside saline water tank 152 is the same or higher than top end 1442 of fourth tank 144, fourth tank 144 may be full of saline water. In an exemplary embodiment, a temperature of medium section 1296 of second tube 129, a temperature of medium section 1434 of fifth tube 143, a temperature of third section 167 of sixth tube 106, and a temperature of second end 1484 of second channel 148 may be higher than a temperature of saline water inside fourth tank 144. Consequently, in an exemplary embodiment, saline water inside fourth tank 144 may heat up and then may flow to third tank 142 through third tube 146.

As shown in FIG. 1A and FIG. 1B, in an exemplary embodiment, desalination section 104 may further include a plurality of water sprinklers 145. In an exemplary embodiment, plurality of water sprinklers 145 may be disposed inside third tank 142 and above second section 166 of sixth tube 106. In an exemplary embodiment, plurality of water sprinklers 145 may be attached to second end 1464 of third tube 146. In an exemplary embodiment, plurality of water sprinklers 145 may be in fluid communication with third tube 146. In an exemplary embodiment, plurality of water sprinklers 145 may be configured to sprinkle water onto second section 166 of sixth tube 106.

In an exemplary embodiment, when hot water passes through second section 166 of sixth tube 106, a part of saline water inside third tank 142 may be vaporized and enter second channel 148. In an exemplary embodiment, when the vaporized water passes through second channel 148, it may be condensed due to the heat exchange with the colder saline water inside fourth tank 144. In an exemplary embodiment, after condensation, freshwater may discharge from second end 1484 of second channel 148.

In an exemplary embodiment, desalination section 104 may further include a float mechanism 156 disposed inside saline water tank 152. In an exemplary embodiment, float mechanism 156 may be configured to control a level of saline water inside saline water tank 152. In an exemplary embodiment, when a level of saline water inside saline water tank 152 becomes lower than a threshold, float mechanism 156 may allow saline water to be poured into saline water tank 152 and level up saline water inside saline water tank 152.

By utilizing system 100, seawater may be heated and treated through multiple processes using wasted steam energy, and in return, the steams may be cooled down and condensed to a liquid. As a result, the need for cooling towers in power plants may be reduced or otherwise eliminated. After entering a saline water such as seawater into system 100 and converting most of it into steam, the salty remainder may be discharged. Then, the steam may be cooled down and condensed to freshwater. Moreover, additional steam from the thermal power plant may lose most of its heat and may recycle back to the boilers in a liquid form. Hence, system 100 may be able to improve the performance of power plants, by utilizing the wasted power of the exit steam, to desalinate seawater and even generate electricity. In an exemplary embodiment, system 100 may alleviate requirements for cooling towers and may introduce thermal exchange tanks, radiators, and sprinkles instead of cooling towers.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for water desalination and electricity generation, the system comprising:
   a power generation section, comprising:
      a first tank configured to store water;
      a second tank configured to store water, a top end of the second tank in fluid communication with the first tank through a first tube, the first tube configured to allow water to go from the second tank to the first tank;
      a first channel, a first end of the first channel connected to a top end of the first tank, a second end of the first channel disposed inside the second tank;
      a second tube, a first end of the second tube connected to the second end of the first channel, the second tube passing through a fourth tank and returning to a bottom end of the second tank; and
      a first turbine, the first turbine disposed inside the first channel, the first turbine configured to generate electricity responsive to passage of steam inside the first channel;
   a desalination section, comprising:
      a third tank configured to store water;
      the fourth tank configured to store water, a top end of the fourth tank in fluid communication with the third tank through a third tube, a bottom end of the fourth tank in fluid communication with an amount of saline water contained in a saline water tank through a fourth tube, the fourth tube configured to allow saline water to go from the saline water tank to the fourth tank;
      a second channel, a first end of the second channel connected to a top end of the third tank, a second end of the second channel disposed inside the fourth tank;
      and a fifth tube, a first end of the fifth tube connected to a bottom end of the third tank, the fifth tube configured to allow water to go out from the third tank, a medium section of the fifth tube disposed inside the fourth tank, the medium section of the fifth tube configured to allow heat transfer between water inside the fifth tube and saline water inside the fourth tank; and a sixth tube, a first end of the sixth tube connected to a turbine of a power plant, the first end of the sixth tube configured to receive hot steam from the turbine of the power plant, a second end of the sixth tube connected to a boiler of the power plant, the second end of the sixth tube configured to deliver cool water to the boiler of the power plant, a first section of the sixth tube disposed inside the first tank, the first section of the sixth tube configured to allow heat transfer between water inside the first section of the sixth tube and water inside the first tank, a second section of the sixth tube disposed inside the third tank, the second section of the sixth tube configured to allow heat transfer between water inside the second section of the sixth tube and saline water inside the third tank, a third section of the sixth tube disposed inside the fourth tank, the third section of the sixth tube configured to allow heat transfer between water inside the third section of the sixth tube and saline water inside the fourth tank, the first section of the sixth tube directly connected to the first end of the sixth tube, the third section of the sixth tube directly connected to the second end of the sixth tube;

wherein:
   the sixth tube configured to:
      receive an amount of hot water as steam from the turbine of the power plant at the first end of the sixth tube;
      generate an amount of cooled water from the amount of hot water by passing the amount of hot water through the first section of the sixth tube, the second section of the sixth tube, and the third section of the sixth tube; and
      deliver the amount of the cooled water to the boiler of the power plant at the second end of the sixth tube;
   responsive to passing a first amount of water through the first section of the sixth tube, the first amount of water cools down due to heat transfer between the first amount of water and water inside the first tank;
   responsive to passing a second amount of water through the second section of the sixth tube, the second amount of water cools down due to heat transfer between the second amount of water and water inside the third tank;
   responsive to passing a third amount of water through the third section of the sixth tube, the third amount of water cools down due to heat transfer between the third amount of water inside the third section of the sixth tube and saline water inside the fourth tank;
   the second tube comprises a medium section, the medium section of the second tube disposed inside the fourth tank, the medium section of the second tube configured to allow heat transfer between water inside the medium section of the second tube and saline water inside the fourth tank;
   responsive to passing the first amount of water through the first section of the sixth tube, a fourth amount of water from water inside the first tank evaporates and enters the first channel;
   responsive to passing the fourth amount of water through the second end of the first channel:
      the fourth amount of water cools down due to heat transfer between the fourth amount of water and water inside the second tank;
      the fourth amount of water enters the second tube; and
      water inside the second tank heats up;
   responsive to passing the fourth amount of water through the medium section of the second tube:
      the fourth amount of water cools down due to heat transfer between the fourth amount of water and water inside the fourth tank; and
      the fourth amount of water enters the second tank from the bottom end of the second tank;
   the medium section of the fifth tube, the medium section of the second tube, the third section of the sixth tube, and the second end of the second channel are configured to heat up saline water inside the fourth tank;
   the second section of the sixth tube is configured to heat up saline water inside the third tank;
   responsive to heating up saline water inside the third tank:
      an amount of desalinated water evaporates and enters the second channel;
      the amount of desalinated water cools down at the second end of the second channel due to heat transfer between the amount of desalinated water inside the second channel and saline water inside the fourth tank;
      the amount of desalinated water goes out from the second end of the second channel; and
      an amount of saline water goes out from the bottom end of the third tank through the fifth tube.

2. The system of claim 1, wherein:
a first end of the first tube is connected to the top end of the second tank; and
a second end of the first tube is connected to the first tank.

3. The system of claim 2, wherein the desalination section further comprises a plurality of water sprinklers, the plurality of water sprinklers disposed inside the third tank and above the second section of the sixth tube, the plurality of water sprinklers attached to the second end of the third tube, the plurality of water sprinklers in fluid communication with the third tube, the plurality of water sprinklers configured to sprinkle water onto the second section of the sixth tube.

4. The system of claim 3, wherein the desalination section further comprises a float mechanism disposed inside the saline water tank, the float mechanism configured to control a level of saline water inside the saline water tank, responsive to decreasing a level of saline water inside the saline water tank, the float mechanism allowing saline water to be poured into the saline water tank.

5. The system of claim 4, wherein the second end of the first channel is disposed at the bottom end of the second tank.

6. The system of claim 5, wherein the second end of the second channel is disposed at the bottom end of the fourth tank.

* * * * *